(12) United States Patent
Shoji

(10) Patent No.: US 11,791,744 B2
(45) Date of Patent: Oct. 17, 2023

(54) RECTIFIER CIRCUIT AND WIRELESS POWER TRANSMISSION APPARATUS

(71) Applicant: CANON KABUSHIKI KAISHA, Tokyo (JP)

(72) Inventor: Yuki Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/341,203

(22) Filed: Jun. 7, 2021

(65) Prior Publication Data

US 2021/0391805 A1 Dec. 16, 2021

(30) Foreign Application Priority Data

Jun. 12, 2020 (JP) ................................ 2020-102223

(51) Int. Cl.
*H02M 7/219* (2006.01)
*H02J 50/10* (2016.01)
*H02K 7/18* (2006.01)

(52) U.S. Cl.
CPC ............. *H02M 7/219* (2013.01); *H02J 50/10* (2016.02); *H02K 7/18* (2013.01)

(58) Field of Classification Search
CPC ............ H02J 50/10; H02M 7/02; H02M 7/04; H02M 7/12; H02M 7/21; H02M 7/217; H02M 7/219; H02M 7/2195; H02M 7/23
See application file for complete search history.

(56) References Cited

U.S. PATENT DOCUMENTS

| | | | | |
|---|---|---|---|---|
| 2007/0058402 | A1* | 3/2007 | Shekhawat | H02M 7/219 363/89 |
| 2010/0135053 | A1* | 6/2010 | Morimoto | H02M 7/219 363/127 |
| 2011/0181123 | A1* | 7/2011 | Ichikawa | H01F 38/00 307/104 |
| 2013/0155730 | A1* | 6/2013 | Reichard | A61K 49/005 363/37 |
| 2014/0071724 | A1* | 3/2014 | Chiba | H02M 7/2173 363/89 |
| 2015/0263100 | A1* | 9/2015 | Deboy | H01L 27/0605 327/537 |
| 2015/0280548 | A1* | 10/2015 | Shoyama | H02M 1/4233 363/126 |
| 2017/0302193 | A1* | 10/2017 | Zhang | H02M 7/219 |
| 2017/0302194 | A1* | 10/2017 | Zhang | H02M 7/219 |
| 2018/0294740 | A1* | 10/2018 | Takagi | H02M 1/4258 |
| 2019/0097527 | A1* | 3/2019 | Bhardwaj | H02M 1/4208 |
| 2020/0287468 | A1* | 9/2020 | Mizutani | H02M 7/06 |
| 2021/0336533 | A1* | 10/2021 | Benabdelaziz | H02M 7/12 |

FOREIGN PATENT DOCUMENTS

WO 2018123552 A1 7/2018

* cited by examiner

*Primary Examiner* — Levi Gannon
(74) *Attorney, Agent, or Firm* — Canon U.S.A., Inc. IP Division

(57) ABSTRACT

A rectifier circuit includes a switch circuit including at least one bidirectional switch and configured to rectify an alternating-current voltage of an alternating-current voltage line, and a surge suppression circuit connected to the alternating-current voltage line and configured to suppress a surge voltage of the switch circuit, where a dead time when the bidirectional switch is turned off is present.

16 Claims, 15 Drawing Sheets

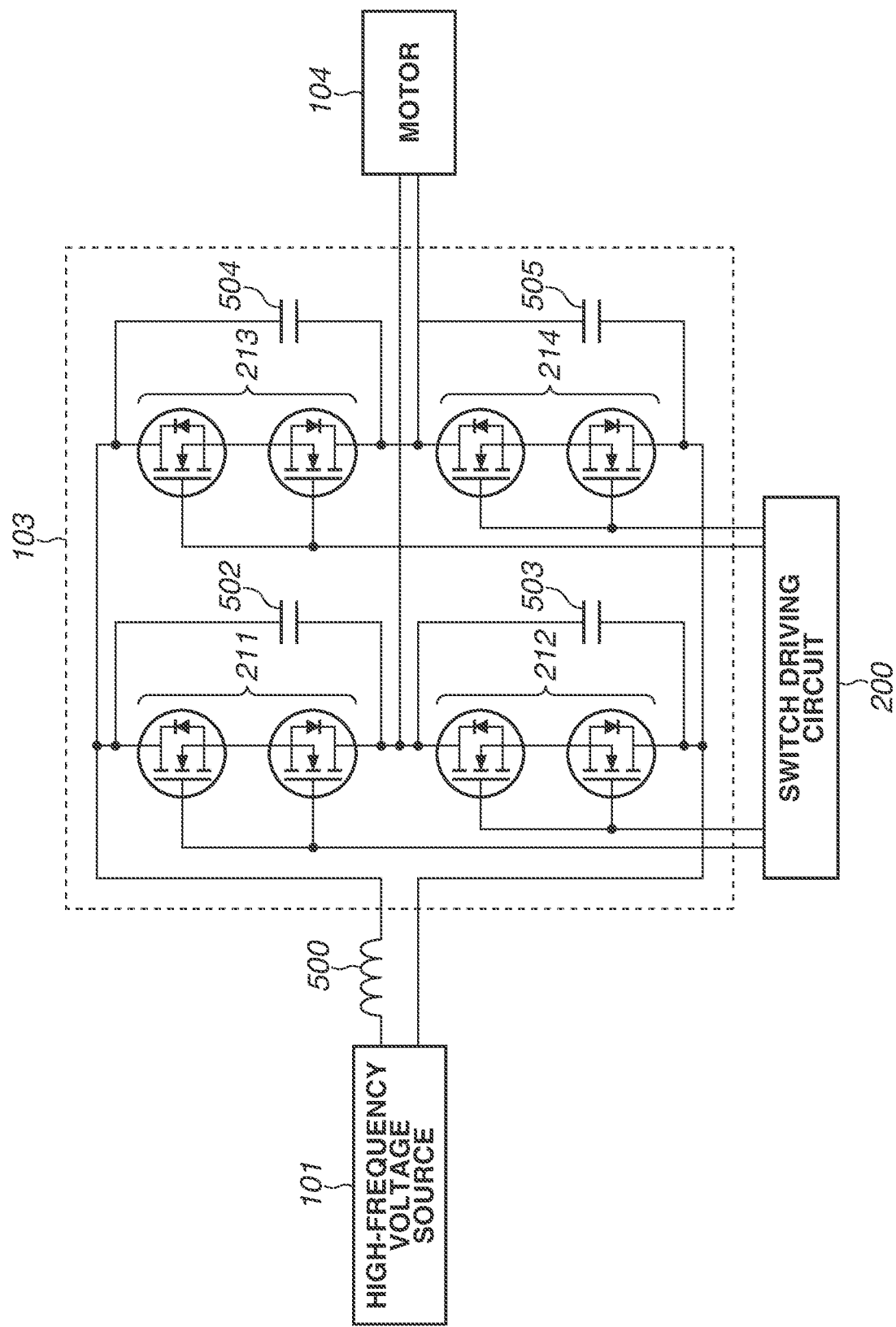

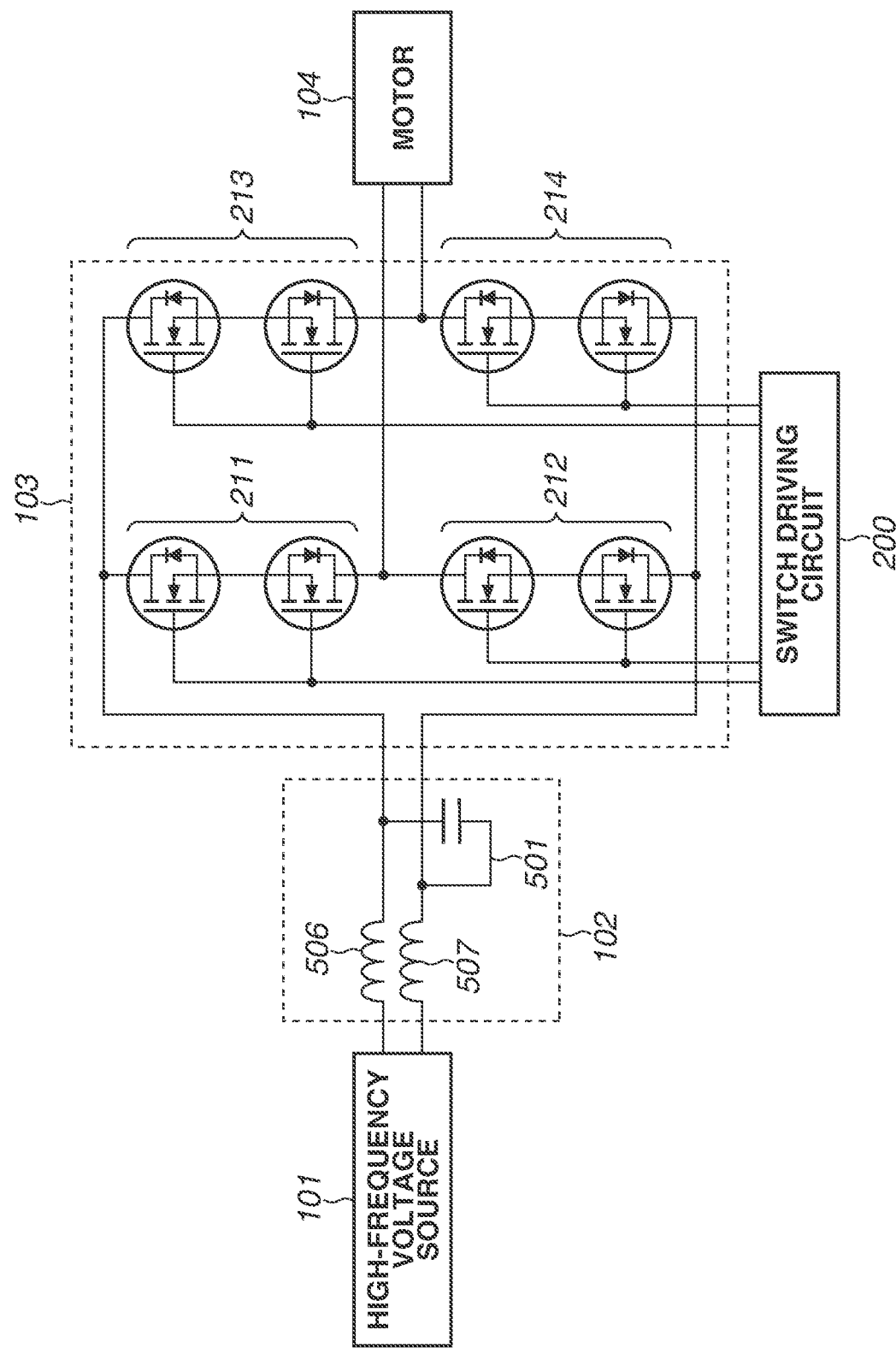

FIG.8

| SYMBOL | VALUE |
|---|---|
| R1 | 1 Ω |
| Li1 | 5 nH |
| Li2 | 5 nH |
| Ls1 | 2 nH |
| Ls2 | 2 nH |
| Ls3 | 2 nH |
| Ls4 | 2 nH |
| Lo1 | 5 nH |
| Lo2 | 5 nH |
| Co | 0.5 µF |
| RL | 10 Ω |
| L1 | 470 nH |
| L1' | 470 nH |
| C1 | 2.2 nF |

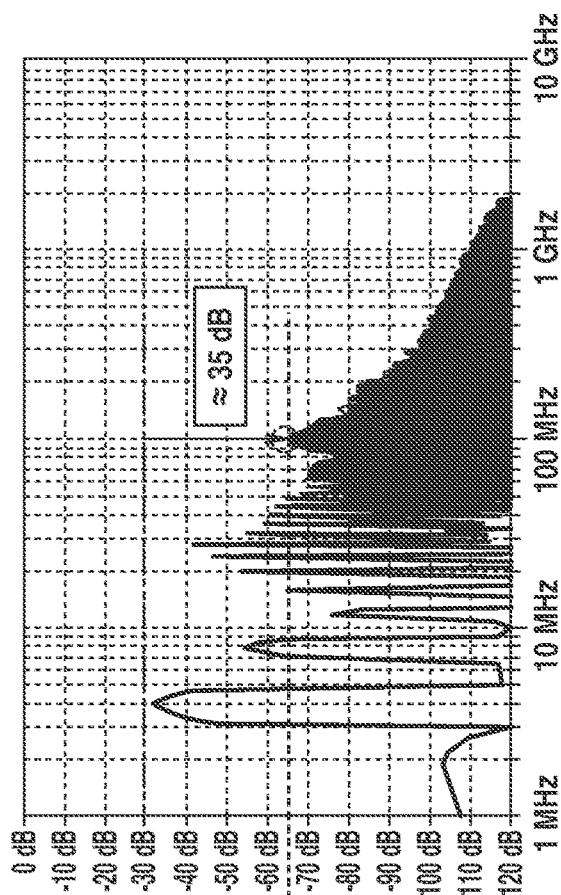
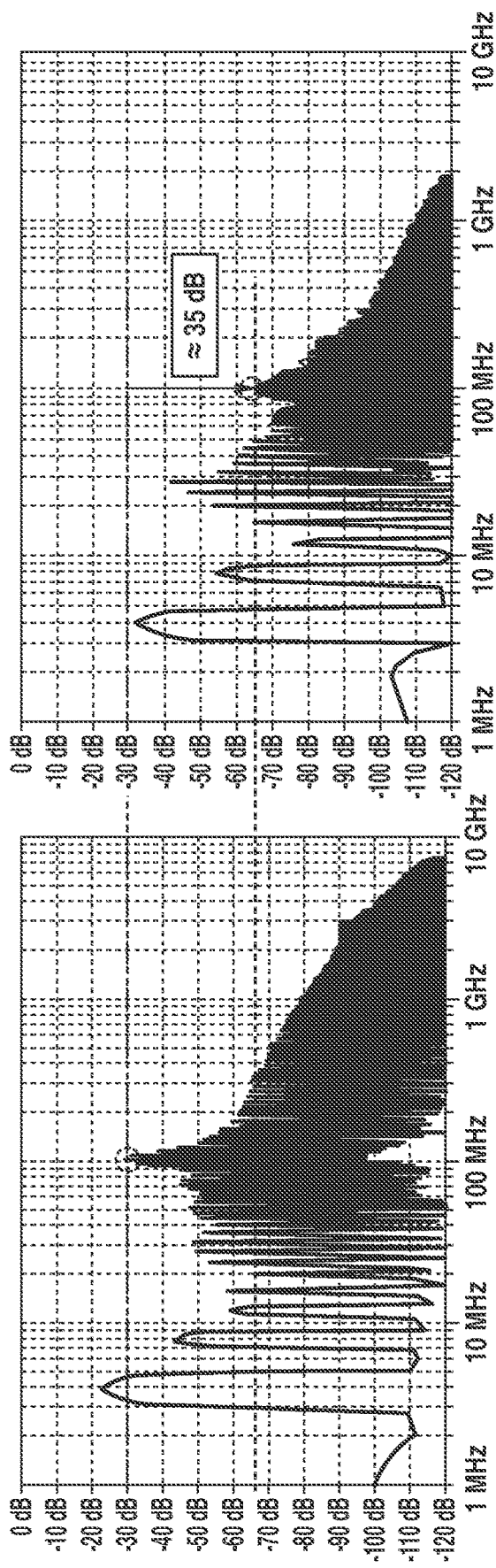

# RECTIFIER CIRCUIT AND WIRELESS POWER TRANSMISSION APPARATUS

BACKGROUND

Field

The present disclosure relates to a rectifier circuit and a wireless power transmission apparatus.

Description of the Related Art

There is a system that supplies power to a motor to drive the motor. For example, in a semiconductor exposure apparatus, a motor that finely moves a wafer to form a pattern on the wafer is mounted on a stage that moves the wafer to an exposure position, and a feeding cable supplying the power to drive the motor is connected onto the stage. The cable moves with movement of the stage, so that tension of the cable influences positioning accuracy of the stage. Accordingly, wireless power transmission for motor driving has been considered.

International Publication No. WO2018/123552 discusses a snubber circuit that converts electric energy generated on a secondary side of a power conversion circuit into a direct current through a full-wave rectifier circuit and a capacitor connected at a circuit position where the electric energy is absorbable, and then regenerates the direct current to a direct-current power supply on a primary side through a transformer.

The snubber circuit discussed in International Publication No. WO2018/123552 requires a diode for full-wave rectification and a plurality of switch circuits for regeneration of the power. The snubber circuit discussed in International Publication No. WO2018/123552 further requires a mechanism controlling the diode and the switch circuits. This increases a scale of the system and its cost, and has an issue about heat generation.

In recent years, high-accuracy control of a voltage to be applied to a load unit such as a motor is desired. For example, in the semiconductor exposure apparatus, increase in accuracy of a motor control voltage is desired in order to move a reticle stage with high accuracy along with improvement in performance.

SUMMARY

Various embodiments of the present disclosure provide improvement of output voltage accuracy of a switch circuit through suppression of a surge voltage of the switch circuit.

A rectifier circuit includes a switch circuit including at least one bidirectional switch and configured to rectify an alternating-current voltage of an alternating-current voltage line, and a surge suppression circuit connected to the alternating-current voltage line and configured to suppress a surge voltage of the switch circuit, wherein a dead time when the bidirectional switch is turned off is present.

Further features of various embodiments of the present disclosure will become apparent from the following description of exemplary embodiments with reference to the attached drawings.

BRIEF DESCRIPTION OF THE DRAWINGS

FIGS. 5A, 5B, and 5C are diagrams each illustrating a specific example of a surge suppression circuit according to one embodiment.

FIG. 8 is a diagram illustrating circuit constants according to one embodiment.

FIGS. 10A and 10B are diagrams each illustrating a simulation result (frequency region) according to one embodiment.

DESCRIPTION OF THE EMBODIMENTS

Figure 1:
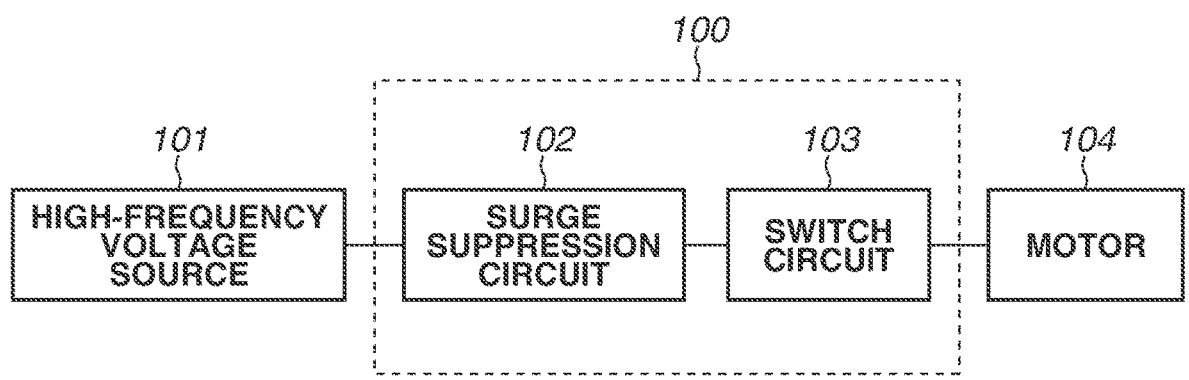
FIG. 1 is a diagram illustrating a configuration example of a rectifier circuit according to one embodiment.

FIG. 1 is a diagram illustrating a configuration example of a rectifier circuit 100 according to a first exemplary embodiment. The rectifier circuit 100 includes a surge suppression circuit 102 and a switch circuit 103, and is connected to a high-frequency voltage source 101 and a motor 104.

The rectifier circuit 100 is connected to a high-frequency voltage line of the high-frequency voltage source 101. The high-frequency voltage line is an alternating-current voltage line. The high-frequency voltage source 101 applies a high-frequency voltage to the rectifier circuit 100 through the high-frequency voltage line. The high-frequency voltage is an alternating-current voltage. The switch circuit 103 converts the high-frequency voltage into a direct-current voltage by rectifying the high-frequency voltage applied by the high-frequency voltage source 101. The surge suppression circuit 102 is connected between the high-frequency voltage source 101 and the switch circuit 103, and suppresses a surge voltage generated by the switch circuit 103. The switch circuit 103 is connected to the motor 104 and drives the motor 104. The motor 104 is driven by the direct-current voltage rectified by the switch circuit 103.

An amplitude of the high-frequency voltage output from the high-frequency voltage source 101 can be varied with time. In this case, the direct-current voltage applied to the motor 104 is also varied based on the amplitude of the high-frequency voltage. In other words, the high-frequency voltage source 101 can control thrust of the motor 104 by the amplitude of the high-frequency voltage. To rectify the high-frequency voltage by the switch circuit 103, it is desirable that a major frequency of the high-frequency voltage be equal to a frequency of a switch driving signal, which drives the switch circuit 103.

Figure 2:
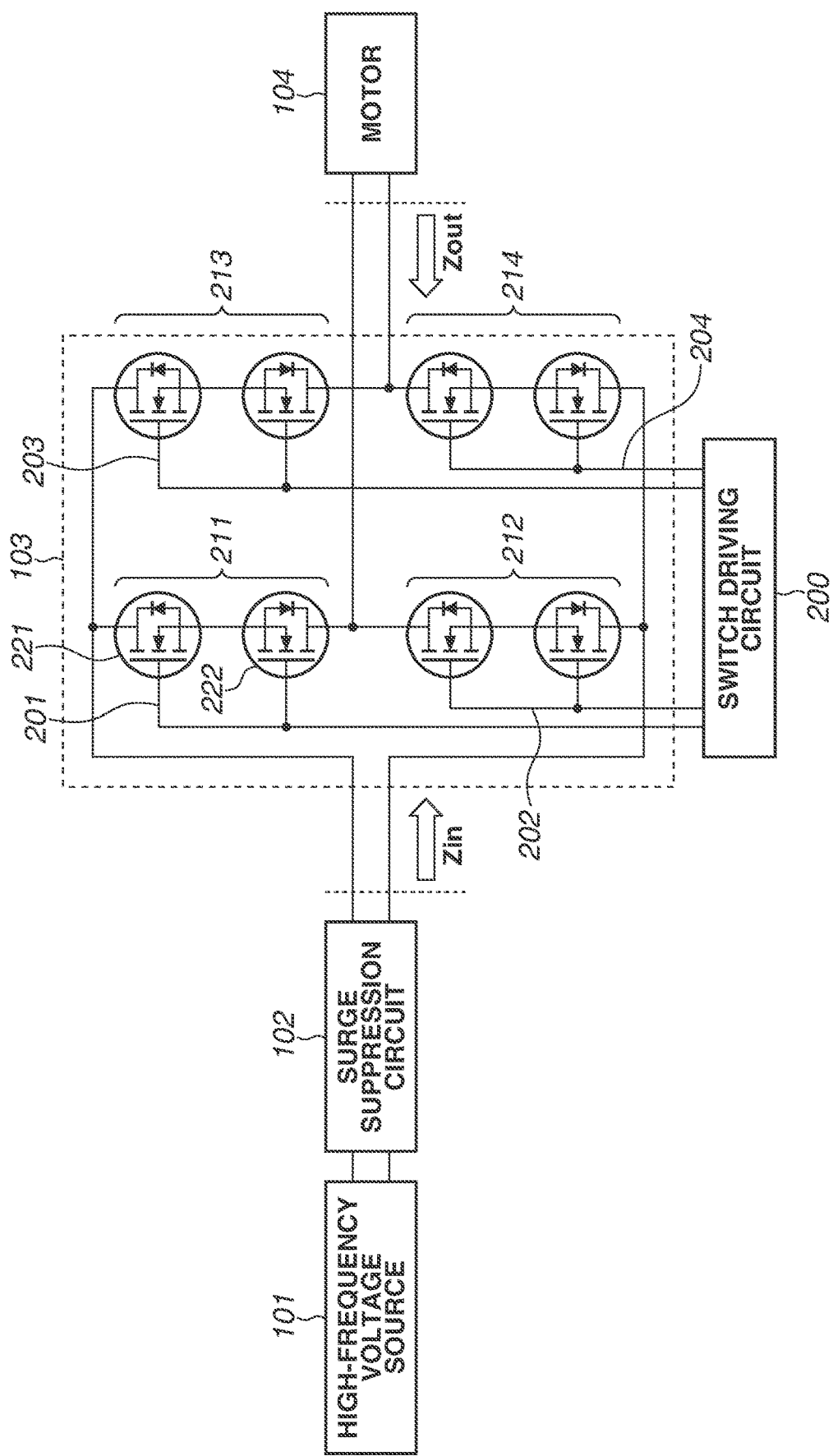
FIG. 2 is a diagram illustrating a configuration example of a switch circuit according to one embodiment.

FIG. 2 is a diagram illustrating a specific example of a configuration of the switch circuit 103 in FIG. 1. First and second output terminals of the high-frequency voltage source 101 are respectively connected to first and second input nodes of the surge suppression circuit 102 through two high-frequency voltage lines. First and second output nodes of the surge suppression circuit 102 are connected to the switch circuit 103 through first and second input lines, respectively.

The switch circuit 103 includes four bidirectional switches 211, 212, 213 and 214 connected to the first or second input line. The bidirectional switches 211 and 212 are connected in series between the first and second input lines. The bidirectional switches 213 and 214 are connected in series between the first and second input lines. A mutual connection point of the bidirectional switches 211 and 212 is connected to the motor 104 through a first output line. A mutual connection point of the bidirectional switches 213 and 214 is connected to the motor 104 through a second output line.

Each of the bidirectional switches 211 to 214 includes two metal-oxide semiconductor field-effect transistors (MOSFETs) 221 and 222. Each of the MOSFETs 221 and 222 is a switching element. In each of the bidirectional switches 211 to 214, a source terminal of the MOSFET 221 and a source terminal of the MOSFET 222 are connected to each other, and a gate terminal of the MOSFET 221 and a gate terminal of the MOSFET 222 are connected to each other. Drain terminals of the MOSFET 221 are connected to the high-frequency voltage source 101 through the surge suppression circuit 102. Drain terminals of the MOSFET 222 are connected to the motor 104. The gate terminals of the MOSFETs 221 and 222 in each of the bidirectional switches 211 to 214 are connected to each other and are connected to a switch driving circuit 200.

The bidirectional switches 211 to 214 respectively include gate terminals 201 to 204. The switch driving circuit 200 outputs switch driving signals of a frequency same as the frequency of the high-frequency voltage output from the high-frequency voltage source 101, to the gate terminals 201 to 204 of the bidirectional switches 211 to 214.

An existing switch circuit uses four MOSFETs. In this case, the switch circuit cannot output a rectification signal varied in both of positive and negative directions. This is because a MOSFET includes a body diode and a parasitic element equivalent to the body diode, and if reverse bias is applied between terminals of the MOSFET, the terminals of the MOSFET become conductive irrespective of a driving state of a gate terminal.

Accordingly, the switch circuit 103 includes the four bidirectional switches 211 to 214 each including the two MOSFETs 221 and 222. Unless the switch driving circuit 200 turns on the MOSFETs 221 and 222, the MOSFETs 221 and 222 do not become conductive. Each of the bidirectional switches 211 to 214 can output a rectification signal varied in both of the positive and negative directions. An impedance Zin is an impedance of an input side of the switch circuit 103 viewed from the surge suppression circuit 102. An impedance Zout is an impedance of an output side of the switch circuit 103 viewed from the motor 104.

A driving power supply between the source and the gate of each of the MOSFETs 221 and 222 includes an insulated power supply or the like, and can be realized by supplying a voltage of about 5 V to about 10 V from a floating power supply with reference to a potential of each source terminal. The bidirectional switches 211 to 214 are driven by the switch driving signals of the switch driving circuit 200 that are with reference to potentials of the source terminals of the bidirectional switches 211 to 214, respectively. A circuit topology of the switch circuit 103 can be of a full-bridge type or a half-bridge type, and it is sufficient for the switch circuit 103 to include at least one bidirectional switch. Further, each of the MOSFETs 221 and 222 can be a gallium nitride field-effect transistor (GaNFET).

Figure 3:
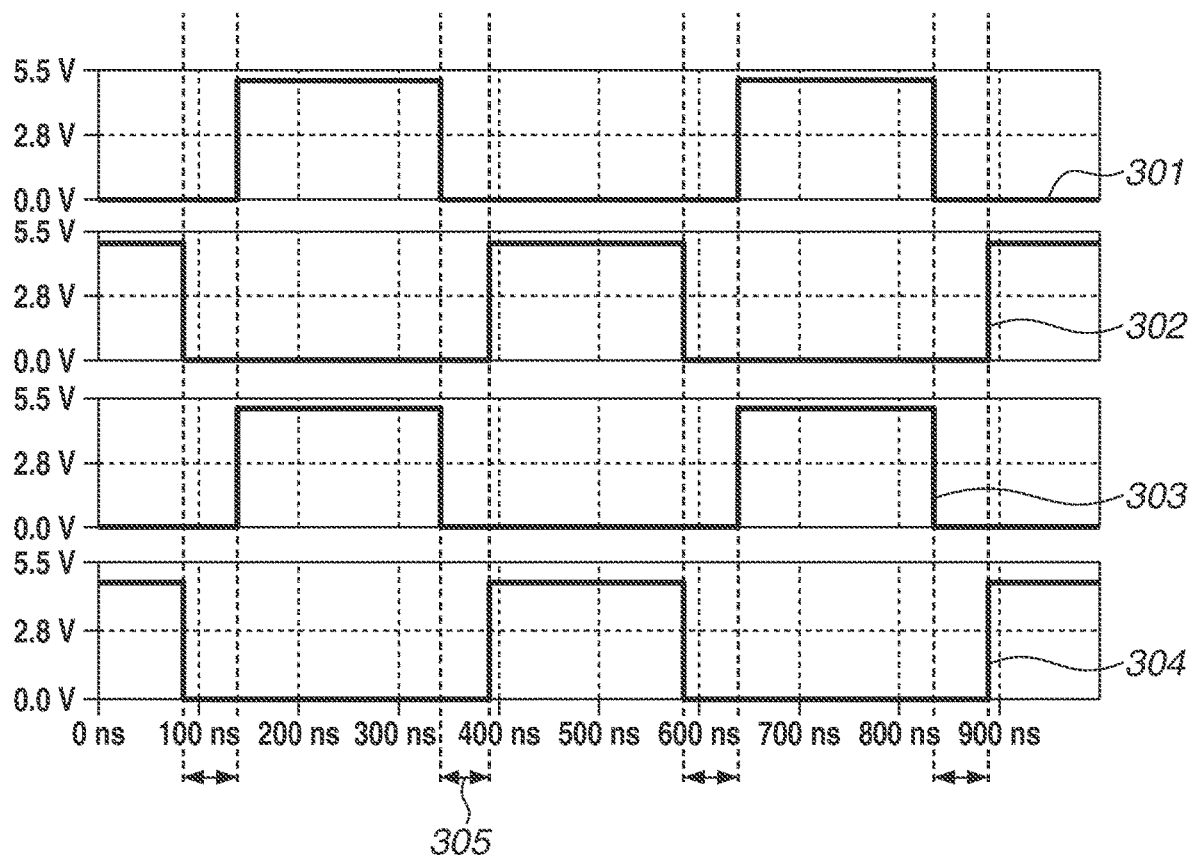
FIG. 3 is a diagram illustrating examples of a switch driving signal according to one embodiment.

FIG. 3 is a diagram illustrating specific examples of switch driving signals 301, 302, 303 and 304 of the switch driving circuit 200. The switch driving circuit 200 outputs the switch driving signals 301 to 304 respectively to the gate terminals 201 to 204 of the bidirectional switches 211 to 214 in FIG. 2. The gate terminal 201 receives the switch driving signal 301, the gate terminal 202 receives the switch driving signal 302, the gate terminal 203 receives the switch driving signal 303, and the gate terminal 204 receives the switch driving signal 304.

In a case where each of the switch driving signals 301 to 304 is at a high level, the MOSFETs 221 and 222 of each of the bidirectional switches 211 to 214 are turned on. In a case where each of the switch driving signals 301 to 304 is at a low level, the MOSFETs 221 and 222 of each of the bidirectional switches 211 to 214 are turned off.

A switching frequency of each of the switch driving signals 301 to 304 is set to 2 MHz. The switch driving signals 301 to 304 are respectively applied to the gate terminals 201 to 204 of the bidirectional switches 211 to 214. The switch driving signal 301 and the switch driving signal 302 are controlled so as not to be active (+5 V in this case) at the same time, and an appropriate dead time 305 is present. Likewise, the switch driving signal 303 and the switch driving signal 304 are controlled so as not to be active (+5 V in this case) at the same time, and the appropriate dead time 305 is present. In the dead time 305, the switch driving signals 301 to 304 become nonactive (0 V in this case) at the same time, and the bidirectional switches 211 to 214 are turned off at the same time.

[Issues Occurring in Rectification of Bidirectional Switch]

In a case where the switch circuit 103 using the bidirectional switches 211 to 214 are controlled by the switch driving signals 301 to 304 into which the dead time 305 is inserted as illustrated in FIG. 3, all of the bidirectional switches 211 to 214 are turned off during a period of the dead time 305. In other words, during the period of the dead time 305, the impedance Zin of the input side of the switch circuit 103 viewed from the surge suppression circuit 102 and the impedance Zout of the output side of the switch circuit 103 viewed from the motor 104 are high.

In a case where the switch circuit 103 is a common switch circuit (including not four bidirectional switches but four MOSFETs), a route enabling recirculation is secured by the body diode parasitic on each of the MOSFETs. Thus, the impedances Zin and Zout do not necessarily become high.

The switch circuit 103 is mounted on, for example, a printed circuit board. A circuit pattern and a via on the printed circuit board each include a floating capacitance and a floating inductance corresponding to a physical shape. If the impedances Zin and Zout of the input side and the output side of the switch circuit 103 are steeply varied before and after the period of the dead time 305, a transient current and a transient voltage corresponding to a variation speed are generated. The switch circuit 103 handling large power is desirably designed such that resistance loss is suppressed as much as possible and conversion efficiency is improved. In other words, the switch circuit 103 is designed to reduce a conductive resistance of each of the substrate pattern and the MOSFETs 221 and 222. If the transient current and the transient voltage as described above are generated in such the switch circuit 103, the transient current and the transient voltage cannot be efficiently attenuated, and a transient state continues for a long time. The transient energy is superimposed on the output signal of the switch circuit 103. Accordingly, the desired output voltage of the switch circuit 103 is mixed with noise, which deteriorates output voltage accuracy of the switch circuit 103. From a different perspective, the above-described phenomenon described as the transient phenomenon is a resonance (oscillation) phenomenon caused by the floating capacitance and the floating inductance on the printed circuit board configuring the switch circuit 103. Hereinafter, the voltage transiently generated is referred to as a surge voltage.

The surge suppression circuit 102 to suppress generation of the surge voltage in the switch circuit 103 is described. To suppress the surge voltage, measures to minimize the floating capacitance and the floating inductance on the printed circuit board configuring the switch circuit 103 are essential. In addition, to further improve the surge voltage, measures to gently change the impedances Zin and Zout of the input side and the output side of the switch circuit 103 before and after the period of the dead time 305 are necessary. More specifically, soft switching that reduces noise using inductance-capacitance (LC) resonance should be adopted.

Figure 4:
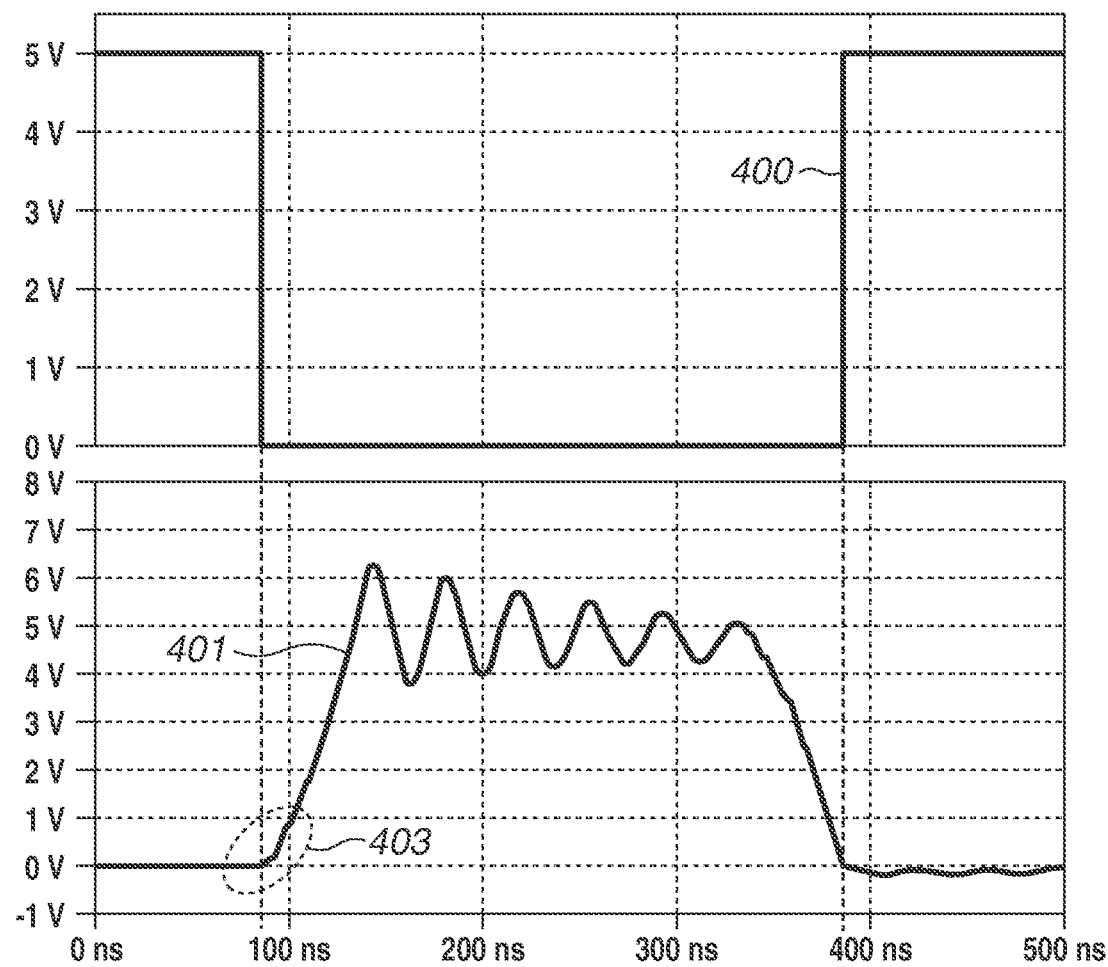
FIG. 4 is a diagram illustrating relationship between the switch driving signal and a waveform of an inter-terminal voltage of the switch circuit according to one embodiment.

FIG. 4 is a diagram illustrating an example of a time waveform of the soft switching. A waveform 400 is, for example, a waveform of the switch driving signal 301. In the following, the example of the switch driving signal 301 is described, and waveforms of the switch driving signals 302 to 304 are similar to the waveform of the switch driving signal 301. When a voltage of the waveform 400 is 5 V, the MOSFETs 221 and 222 of the bidirectional switch 211 are turned on. A waveform 401 indicates an inter-terminal voltage of the bidirectional switch 211. When paying attention to a vicinity of a position 403 of the waveform 401, the waveform 400 transitions from a high level to a low level, and the bidirectional switch 211 transitions from an on state to an off state. At the position 403, in a case where the waveform 401 is defined as a time function V(t), an expression (1) is established.

$$dV/dt \approx 0$$

$$V \approx 0 \qquad \text{Expression (1)}$$

Each of the bidirectional switches 211 to 214 transitions from the on state to the off state at the position 403 where a variation dV/dt of the inter-terminal voltage of each of the bidirectional switches 211 to 214 with respect to the time is substantially zero. Further, each of the bidirectional switches 211 to 214 transitions from the on state to the off state at the position 403 where an inter-terminal voltage V of each of the bidirectional switches 211 to 214 is substantially zero.

Adjusting circuit constants, a phase of the waveform 400, and a length of the dead time 305 so as to establish the expression (1) makes it possible to suppress the surge voltage of the switch circuit 103.

In the present exemplary embodiment, to realize a soft switching operation as illustrated in FIG. 4, the surge suppression circuit 102 is inserted into the rectifier circuit 100.

Figure 5A:
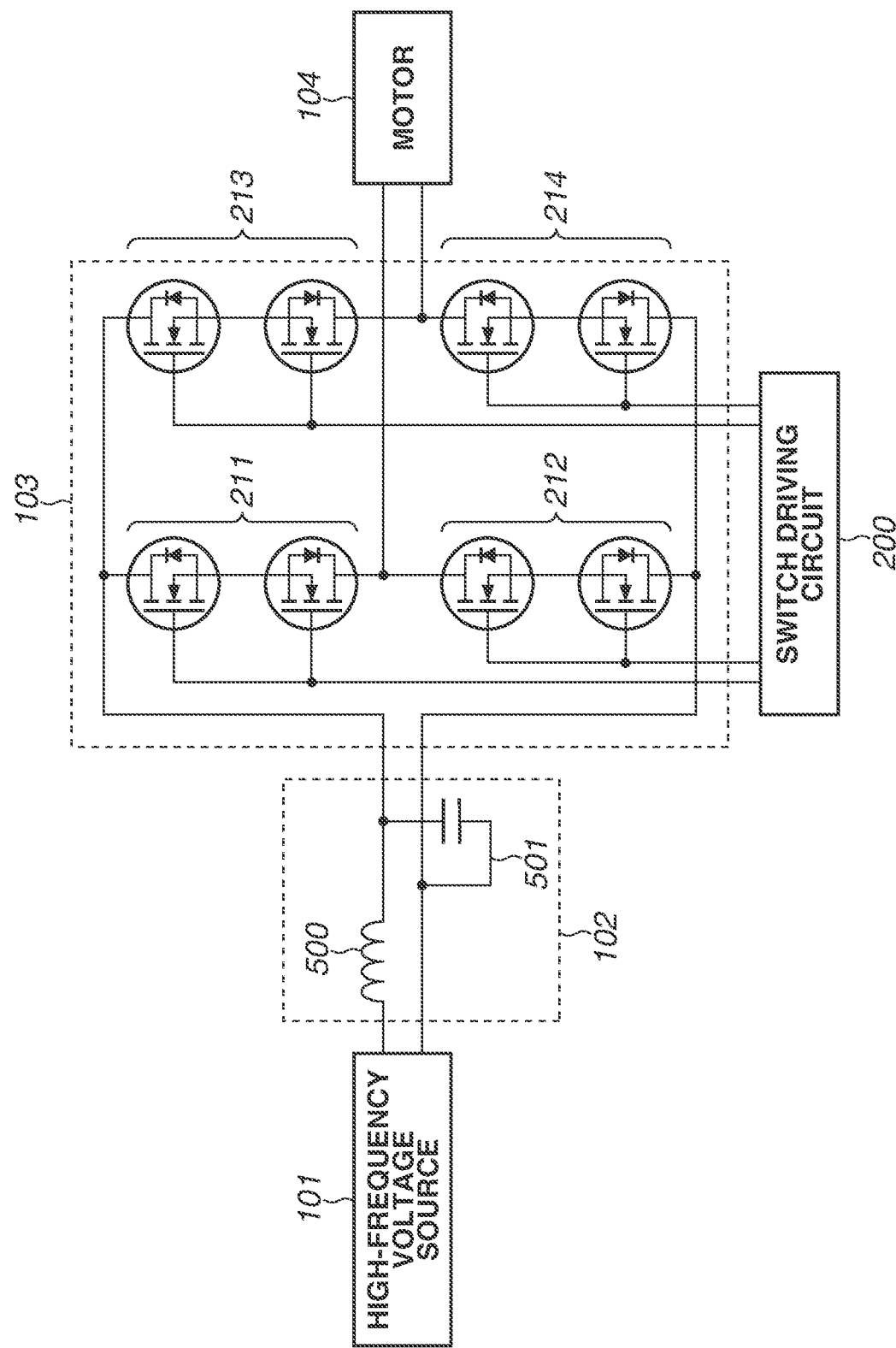

FIGS. 5A to 5C are diagrams each illustrating a specific example of the surge suppression circuit 102. FIG. 5A is a diagram illustrating a configuration example of the surge suppression circuit 102. The surge suppression circuit 102 includes an inductor 500 and a capacitor 501, and suppresses the surge voltage of the switch circuit 103. The inductor 500 is connected between the first output terminal of the high-frequency voltage source 101 and input terminals of the bidirectional switches 211 and 213. The input terminals of the bidirectional switches 211 and 213 are connected to the first input line. The second output terminal of the high-frequency voltage source 101 is connected to input terminals of the bidirectional switches 212 and 214 through the second input line. The capacitor 501 is connected between the input terminals of the bidirectional switches 211 and 213 and the input terminals of the bidirectional switches 212 and 214. One of input terminals of the motor 104 is connected to output terminals of the bidirectional switches 211 and 212 through the first output line. The other input terminal of the motor 104 is connected to output terminals of the bidirectional switches 213 and 214 through the second output line.

During the period of the dead time 305, the inductor 500 outputs magnetic field energy accumulated immediately before the dead time 305, as a current. During the period of the dead time 305, the impedances Zin and Zout of the input side and the output side of the switch circuit 103 are high. Accordingly, substantially all amount of the energy output from the inductor 500 is accumulated in the capacitor 501. A capacitance of the capacitor 501 is desirably determined such that the capacitor 501 can continuously accumulate the energy output from the inductor 500 without saturation during the entire period of the dead time 305. When constants of the inductor 500 and the capacitor 501 can be set as described above, the inter-terminal voltage of the bidirectional switch 211 satisfying the expression (1) as with the waveform 401 in FIG. 4 is obtainable. If the capacitance of the capacitor 501 is insufficient, the surge voltage is caused by energy that cannot be accumulated in the capacitor 501 out of the energy output from the inductor 500 during the period of the dead time 305. In this case, the length of the dead time 305 is to be adjusted based on the capacitance of the capacitor 501 (time before full charge).

FIG. 5B is a diagram illustrating another configuration example of the surge suppression circuit 102. The surge suppression circuit 102 includes the inductor 500 and capacitors 502, 503, 504 and 505, and suppresses the surge voltage of the switch circuit 103. The capacitors 502 to 505 are obtained by dividing the capacitor 501 in FIG. 5A. The capacitor 502 is connected in parallel with the bidirectional switch 211. The capacitor 503 is connected in parallel with the bidirectional switch 212. The capacitor 504 is connected in parallel with the bidirectional switch 213. The capacitor 505 is connected in parallel with the bidirectional switch 214.

In a case where a capacitance of each of the capacitors 502, 503, 504, and 505 is equal to the capacitance of the capacitor 501 in FIG. 5A, the circuit in FIG. 5A and the circuit in FIG. 5B are electrically equivalent to each other. In the case of the circuit in FIG. 5A, the floating inductance is generated by a pattern of the printed circuit board connecting each of the terminals of the bidirectional switches 211 to 214 of the switch circuit 103 and the capacitor 501. The floating inductance is not desirable because the floating inductance causes the surge voltage. In the case of the circuit in FIG. 5B, the floating inductance generated by patterns of the printed circuit board connecting the terminals of the bidirectional switches 211 to 214 and the capacitors 502 to 505, respectively, in the switch circuit 103 is considered to be added to the inductor 500. The inductor 500 has inductance of several 10 nH to several 10 µH, which is sufficiently great with respect to the floating inductance. Therefore, an effect to make the floating inductance inconspicuous can be expected.

FIG. 5C is a diagram illustrating still another configuration example of the surge suppression circuit 102. The surge suppression circuit 102 includes inductors 506 and 507 and the capacitor 501, and suppresses the surge voltage of the switch circuit 103. The inductors 506 and 507 are obtained by dividing the inductor 500 in FIG. 5A. The inductor 506 is connected between one of the output terminals of the high-frequency voltage source 101 and the input terminals of the bidirectional switches 211 and 213. The inductor 507 is connected between the other output terminal of the high-frequency voltage source 101 and the input terminals of the bidirectional switches 212 and 214.

In a case where inductance of each of the inductors 506 and 507 is half the inductance of the inductor 500 in FIG. 5A, the circuit in FIG. 5A and the circuit in FIG. 5C are electrically equivalent to each other. When the inductor 500 in FIG. 5A is divided into the inductors 506 and 507, an absolute value of the high-frequency voltage value becomes substantially equal at points that are electrically separated by substantially the same distance from the high-frequency voltage source 101 in a wiring from the high-frequency voltage source 101 to the switch circuit 103. Bringing a wiring connected to the inductor 506 and a wiring connected to the inductor 507 close to each other makes it possible to cancel high-frequency electric fields generated from the wirings. In other words, electromagnetic fields (noise) generated from the wirings can be suppressed, which makes it possible to reduce intensity of unnecessary radiation electromagnetic fields.

In FIG. 5B, the inductors 506 and 507 can be provided as in FIG. 5C in place of the inductor 500.

Figure 6:
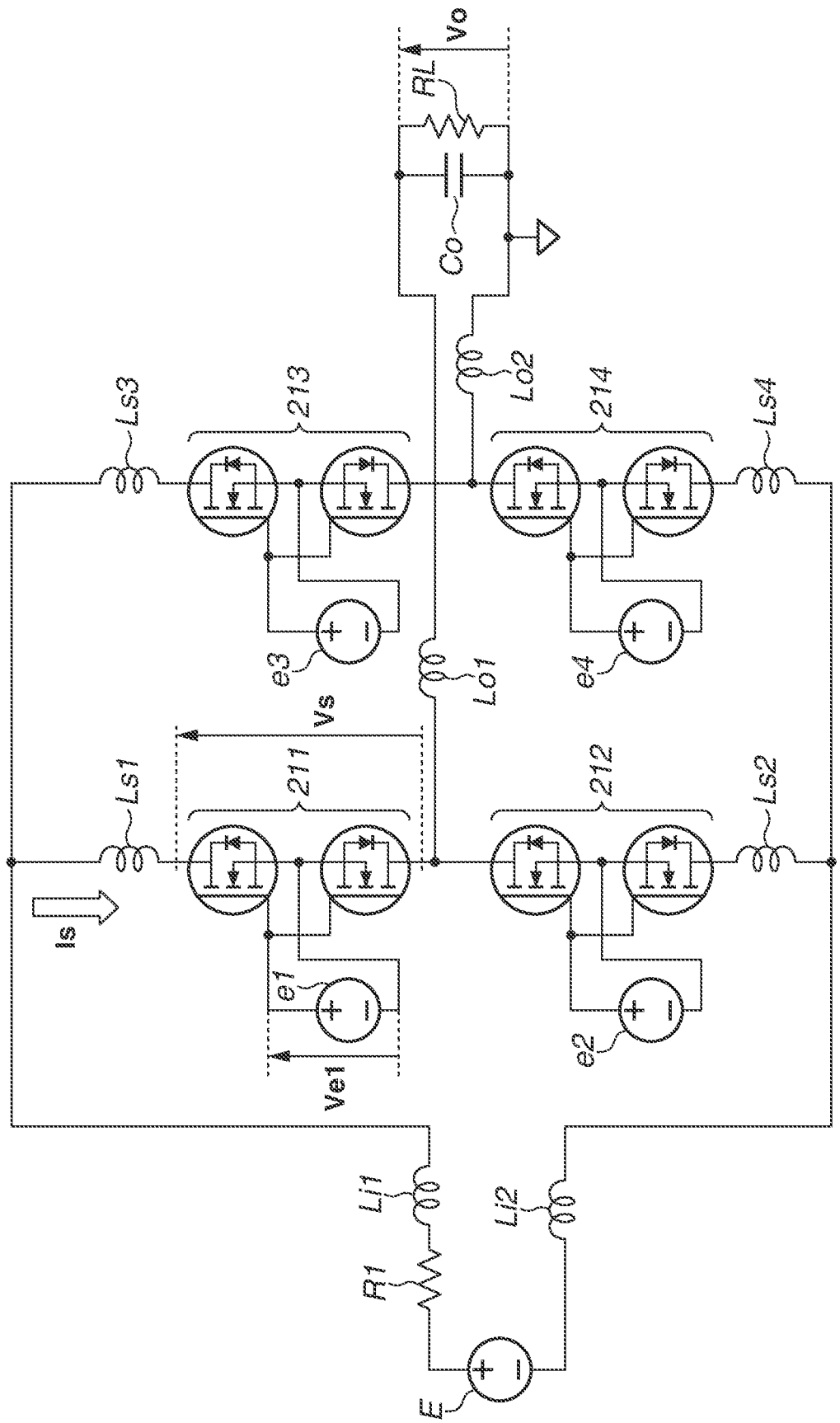
FIG. 6 is a circuit diagram in a case where no surge suppression circuit is provided according to one embodiment.

An effect of suppressing the surge voltage by the surge suppression circuit 102 is described by simulation. FIG. 6 is an equivalent circuit diagram illustrating a configuration example of the rectifier circuit 100 into which no surge suppression circuit 102 is inserted. The switch circuit 103 includes the bidirectional switches 211 to 214. A high-frequency voltage source E is connected to the switch circuit 103 in place of the high-frequency voltage source 101, and a load RL is connected to the switch circuit 103 in place of the motor 104. Inductors Li1, Li2, Ls1, Ls2, Ls3, Ls4, Lo1, and Lo2 are floating inductors that may be generated by the pattern of the printed circuit board. A resistor R1 is an output resistor of the high-frequency voltage source E. The high-frequency voltage source E outputs a high-frequency voltage having a frequency of 2 MHz and an amplitude of 10 V. Voltage sources e1, e2, e3, and e4 are respectively voltage sources of the switch driving signals 301 to 304 output from the switch driving circuit 200. The voltage sources e1, e2, e3, and e4 each output a voltage of 5 V to turn on the respective bidirectional switches 211 to 214, and output a voltage of 0 V to turn off the respective bidirectional switches 211 to 214. The switch driving signals 301 to 304 include the dead time 305 of 50 ns. In other words, a duty ratio of each of the switch driving signals 301 to 304 is 0.4. In addition, a phase of each of the switch driving signals 301 to 304 is adjusted to a substantially optimum phase.

Figure 7:
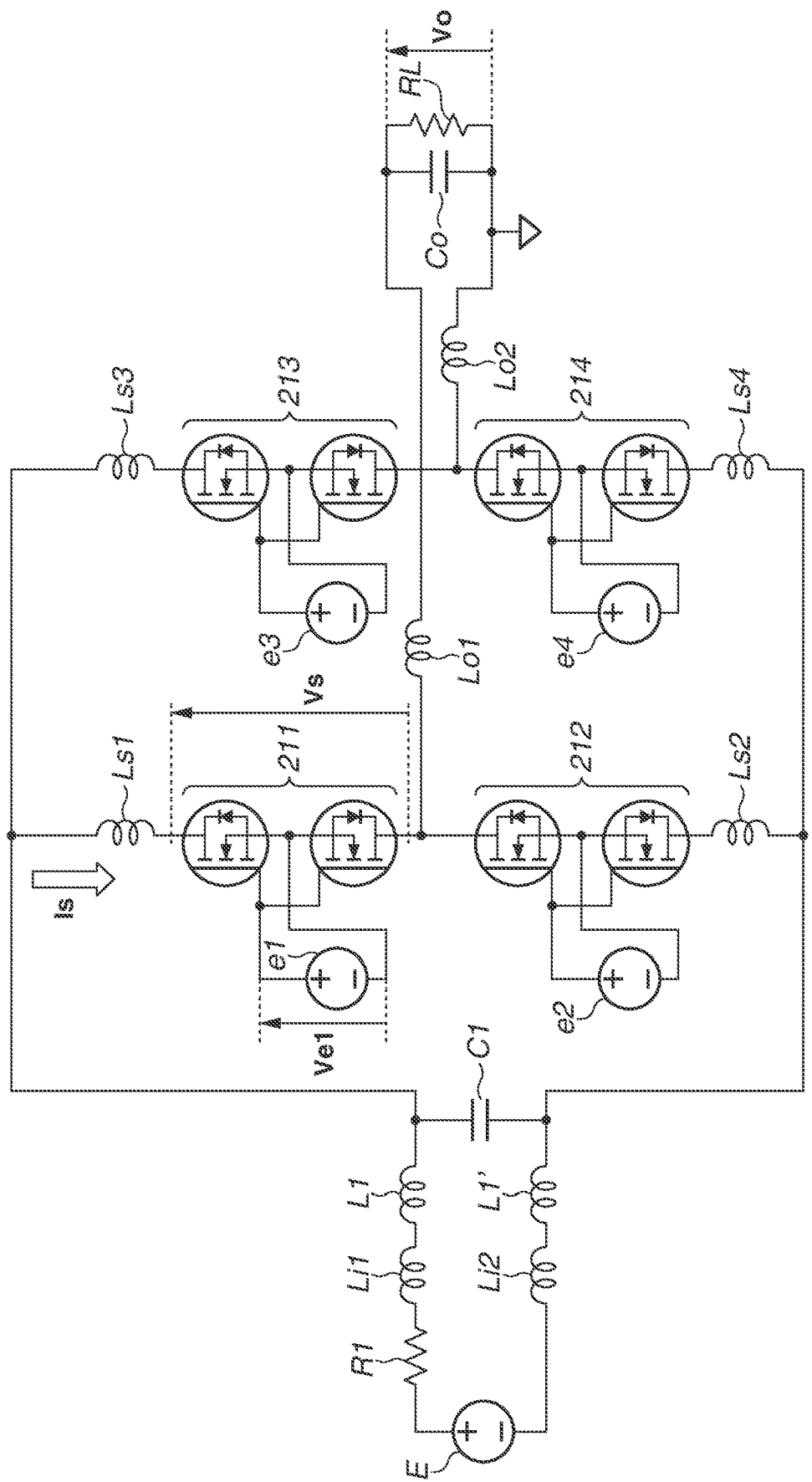
FIG. 7 is a circuit diagram in a case where a surge suppression circuit is provided according to one embodiment.

FIG. 7 is an equivalent circuit diagram illustrating a configuration example of the rectifier circuit 100 into which the surge suppression circuit 102 is inserted. The rectifier circuit 100 in FIG. 7 is obtained by adding the surge suppression circuit 102 to the rectifier circuit 100 in FIG. 6. Circuit elements other than the surge suppression circuit 102 are the same as the circuit elements in FIG. 6. The surge suppression circuit 102 includes inductors L1 and L1', and a capacitor C1. The inductors L1 and L1' respectively correspond to the inductors 506 and 507 in FIG. 5C. The capacitor C1 corresponds to the capacitor 501 in FIG. 5C. FIG. 8 illustrates circuit constants of the circuit elements illustrated in FIG. 6 and FIG. 7.

Figure 9A:
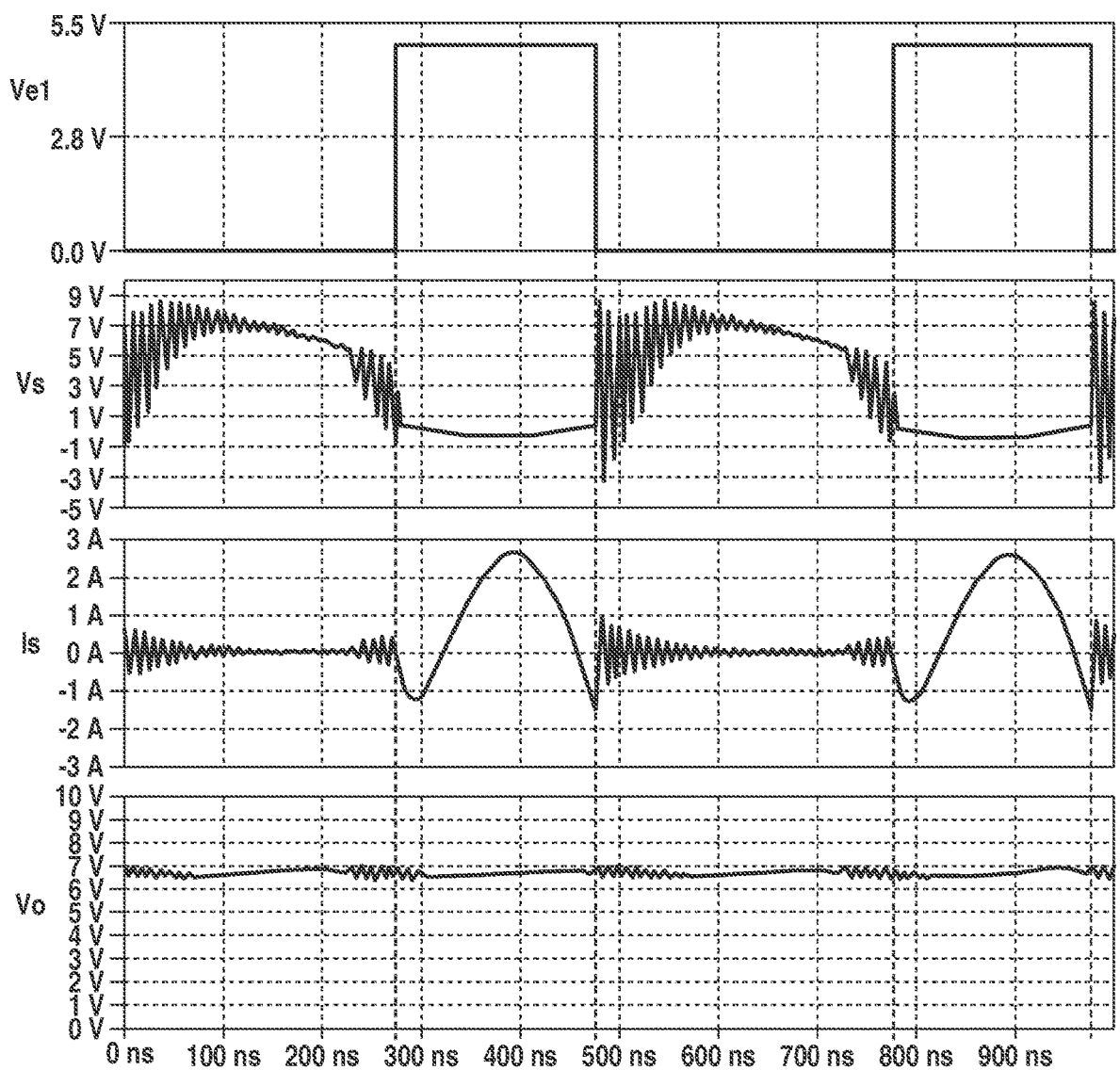
FIGS. 9A and 9B are diagrams each illustrating a simulation result (time waveform) according to one embodiment.

FIG. 9A is a diagram illustrating voltage waveforms and a current waveform at points as a simulation result of the rectifier circuit 100 into which no surge suppression circuit 102 is inserted in FIG. 6. A voltage Vs is the inter-terminal voltage of the bidirectional switch 211. In the voltage Vs, a large surge voltage is observed. A current Is is a current of the bidirectional switch 211. In the current Is, a surge current is observed as in the voltage Vs. It is found that the surge voltage is superimposed on a direct-current voltage component of an output voltage Vo of the switch circuit 103 due to influence of the surge voltage and the surge current. The surge voltage is not desirable because the surge voltage deteriorates accuracy of the output voltage Vo.

Figure 9B:
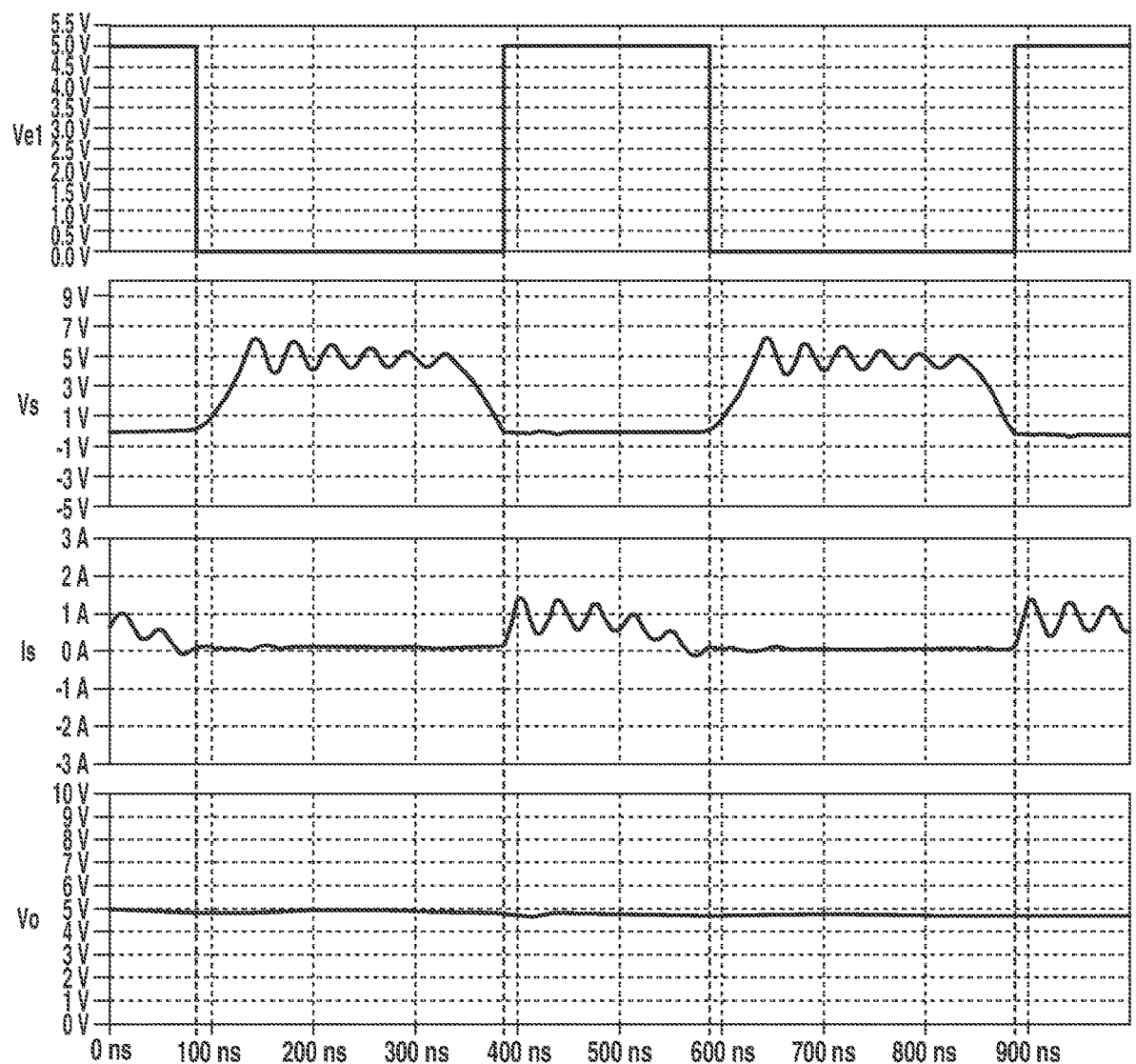

FIG. 9B is a diagram illustrating voltage waveforms and a current waveform at points as a simulation result of the rectifier circuit 100 into which the surge suppression circuit 102 is inserted in FIG. 7. The voltage Vs is the inter-terminal voltage of the bidirectional switch 211. In the voltage Vs of FIG. 9A, the large surge voltage is observed. In contrast, in the voltage Vs of FIG. 9B, the surge voltage is not observed (Resonance voltage of low frequency and low amplitude is superimposed.). The current Is is the current of the bidirectional switch 211. In the current Is of FIG. 9A, the surge current is observed. In contrast, in the current Is of FIG. 9B, the surge current is not observed. Accordingly, the surge voltage is hardly observed in the output voltage Vo of the switch circuit 103 in FIG. 9B. In other words, it is shown that the surge suppression circuit 102 can improve accuracy of the output voltage Vo of the switch circuit 103.

FIG. 10A is a diagram illustrating a frequency spectrum of the output voltage Vo as the simulation result of the rectifier circuit 100 into which no surge suppression circuit 102 is inserted in FIG. 6. FIG. 10B is a diagram illustrating a frequency spectrum of the output voltage Vo as the simulation result of the rectifier circuit 100 into which the surge suppression circuit 102 is inserted in FIG. 7. The frequency spectrum of the output voltage Vo represents a simulation result of fast Fourier transform (FFT) of the output voltage Vo of the switch circuit 103.

When paying attention to a vicinity of 100 MHz as a representative frequency, a surge voltage component in the vicinity of 100 MHz in FIG. 10B is suppressed by −35 dB (3.16E−4 times in voltage amplitude) as compared with a surge voltage component in the vicinity of 100 MHz in FIG. 10A. As the description is given while paying attention on 100 MHz, the surge voltage component in FIG. 10B is wholly suppressed in the other frequency regions as compared with the surge voltage component in FIG. 10A. An integrated value of the surge voltage components of all of the frequency regions is superimposed on the output voltage Vo of the switch circuit 103. Therefore, the effect of suppressing the surge voltage by the surge suppression circuit 102 is extremely high. It is shown by analysis of the frequency region components held by the output voltage Vo of the switch circuit 103 that the surge suppression circuit 102 can improve accuracy of the output voltage Vo of the switch circuit 103.

Figure 11:
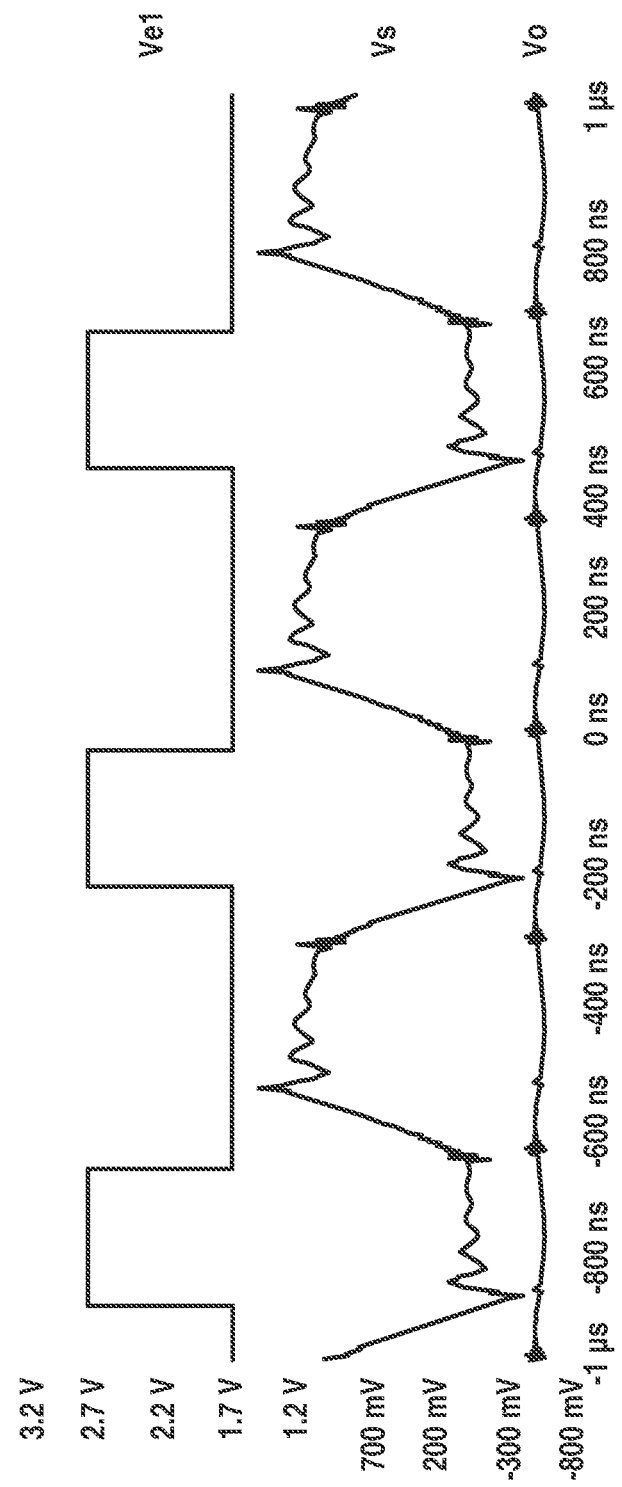
FIG. 11 is a diagram illustrating a measurement result (time waveform) according to one embodiment.

FIG. 11 is a diagram illustrating a measurement result of the suppression effect by the surge suppression circuit 102. A measured configuration of the circuit is equivalent to the configuration of the circuit in FIG. 7. The high-frequency voltage source E outputs a high-frequency voltage having a frequency of 1.51 MHz and an amplitude of 0.5 V. A voltage Ve1 represents a voltage waveform of the switch driving signal 301 output from the voltage source e1. The voltage Ve1 is 1 V when the bidirectional switch 211 is turned on, and is 0 V when the bidirectional switch 211 is turned off.

The gate and the source terminals of the bidirectional switch 211 are driven by the switch driving signal 301 of 5 V. An oscilloscope measures the voltage Ve1 by dividing the voltage of the switch driving signal 301 of 5 V into ⅕. Further, the voltage Ve1 of the switch driving signal 301 has the dead time 305 of 109 ns. In other words, a duty ratio of the voltage Ve1 is about 0.335. A phase of the voltage Ve1 is adjusted to a substantially optimum phase.

In an actually measured voltage Vs illustrated in FIG. 11, the surge voltage is not observed (Resonance voltage of low frequency and low amplitude is superimposed.), as with the voltage Vs illustrated in FIG. 9B. In other words, it is shown by the measurement that the surge suppression circuit 102 can improve accuracy of the output voltage Vo of the switch circuit 103.

As described above, the surge suppression circuit 102 can improve output voltage accuracy of the switch circuit 103 by suppressing the surge voltage generated in the switch circuit 103 including the bidirectional switches 211 to 214.

Figure 12:
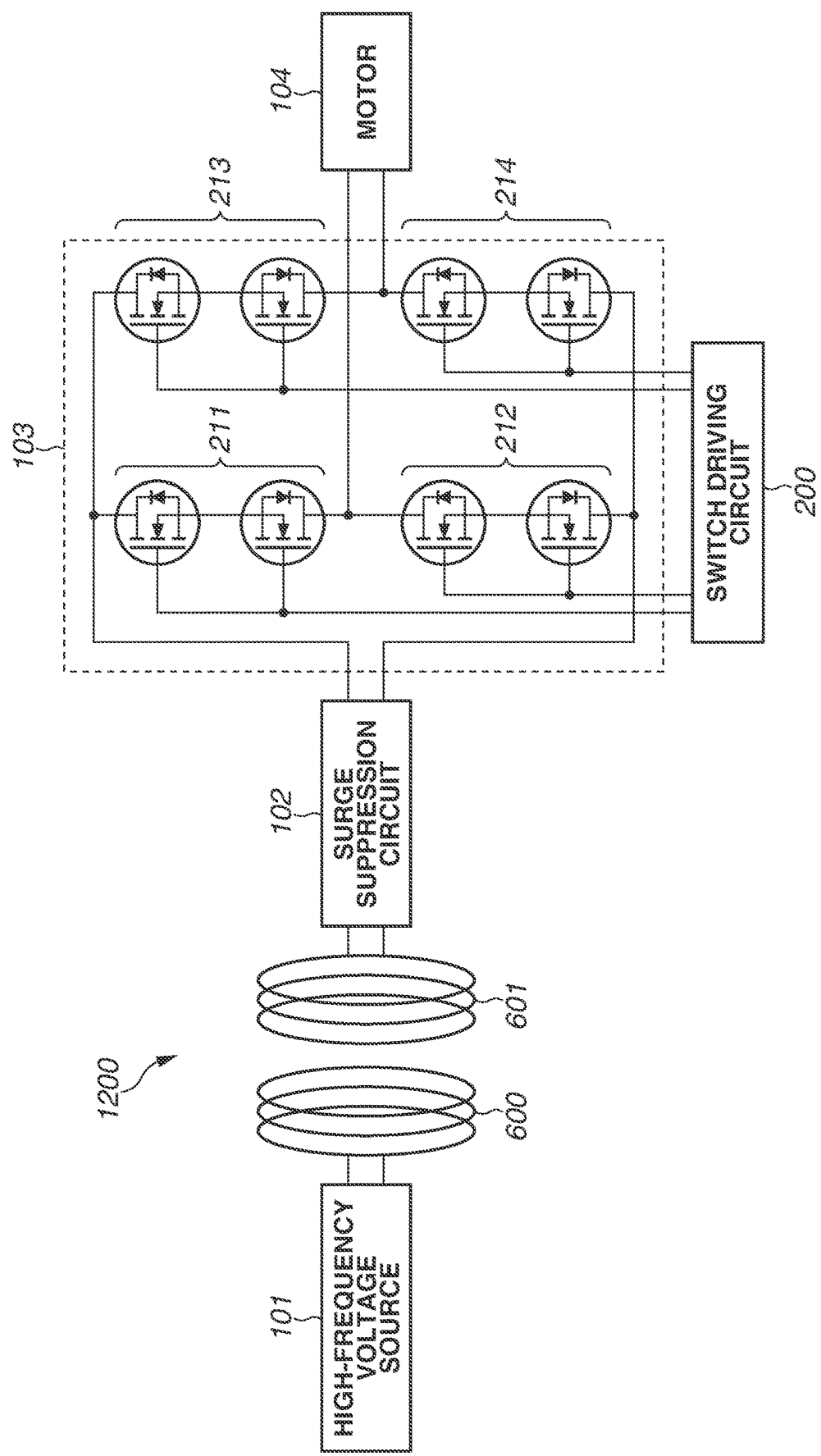
FIG. 12 is a diagram illustrating an example in which the rectifier circuit is applied to a wireless power transmission system according to one embodiment.

FIG. 12 is a diagram illustrating a configuration example of a non-contact wireless power transmission apparatus 1200 according to a second exemplary embodiment. The configuration in FIG. 12 is obtained by adding to the configuration in FIG. 2 a power transmission coil 600 and a power reception coil 601 for wireless power transmission. The high-frequency voltage source 101 applies the high-frequency voltage to the power transmission coil 600. The power transmission coil 600 wirelessly transmits high-frequency power to the power reception coil 601. The high-frequency power is alternating-current power. The power reception coil 601 wirelessly receives the high-frequency power from the power transmission coil 600, and supplies an alternating-current voltage to the switch circuit 103 through the surge suppression circuit 102. The switch circuit 103 rectifies the high-frequency voltage supplied from the power reception coil 601 to convert the high-frequency voltage into a direct-current voltage, and supplies the direct-current voltage to the motor 104. The motor 104 is driven by the direct-current voltage. The surge suppression circuit 102 suppresses the surge voltage of the switch circuit 103.

The power transmission coil and the power reception coil 601 are not electrically connected but are electromagnetically coupled with each other, and power is transmitted from the power transmission coil 600 to the power reception coil 601 in a non-contact manner. To cancel inductances of the power transmission coil 600 and the power reception coil 601 and to improve a power factor, a capacitor is desirably added in series with the power transmission coil 600 and the power reception coil 601. In this case, a phase of the input voltage and a phase of the output current of the surge suppression circuit 102 are substantially synchronized with each other (power factor 1). This state is coincident with a condition of the input voltage and the output current of the surge suppression circuit 102 in FIG. 7. In other words, in the non-contact wireless power transmission apparatus 1200 also, the effect of improving output voltage accuracy of the switch circuit 103 (suppressing surge voltage) is obtainable by insertion of the surge suppression circuit 102.

The above-described exemplary embodiments merely illustrate examples of implementation in carrying out of the present disclosure, and the technical scope of the present disclosure should not be construed in a limited manner by these exemplary embodiments. In other words, the present disclosure can be implemented in various forms without departing from the technical idea or the main features of the present disclosure.

According to the above-described exemplary embodiments, it is possible to improve output voltage accuracy of the switch circuit by suppressing the surge voltage of the switch circuit.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-102223, filed Jun. 12, 2020, which is hereby incorporated by reference herein in its entirety.

What is claimed is:

1. A rectifier circuit, comprising:
   a switch circuit having a plurality of switches and configured to rectify an alternating-current voltage of an alternating-current voltage line, all of the plurality of switches being bidirectional switches, wherein a dead time when all of the bidirectional switches are turned off is present; and
   a surge suppression circuit connected to the alternating-current voltage line and including a first inductor and a first capacitor configured to continuously accumulate energy output from the first inductor without saturation during a period of the dead time.

2. The rectifier circuit according to claim 1, wherein the bidirectional switches transitions from an on state to an off state at a timing when an inter-terminal voltage of the bidirectional switch is substantially zero.

3. The rectifier circuit according to claim 1, wherein the bidirectional switches transition from an on state to an off state at a timing when a variation of an inter-terminal voltage of the bidirectional switches to a time is substantially zero.

4. The rectifier circuit according to claim 1, wherein the first capacitor is connected between two alternating-current voltage lines.

5. The rectifier circuit according to claim 1, wherein the first inductor is connected between one of two alternating-current voltage lines and the switch circuit.

6. The rectifier circuit according to claim 1, wherein the switch circuit is of a full-bridge type.

7. The rectifier circuit according to claim 1, wherein the switch circuit is of a half-bridge type.

8. The rectifier circuit according to claim 1,
wherein the switch circuit includes first and second input lines respectively connected to first and second output nodes of the surge suppression circuit, first and second bidirectional switches connected in series between the first and second input lines, and third and fourth bidirectional switches connected in series between the first and second input lines,
wherein a mutual connection point of the first and second bidirectional switches is connected to a first output line, and
wherein a mutual connection point of the third and fourth bidirectional switches is connected to a second output line.

9. The rectifier circuit according to claim 8, wherein the dead time when the first to fourth bidirectional switches are turned off at a time is present.

10. The rectifier circuit according to claim 8, wherein the first inductor is connected between one of two alternating-current voltage lines and the first input line, and the first capacitor is connected between the first and second input lines.

11. The rectifier circuit according to claim 8, wherein the surge suppression circuit includes the first inductor connected between one of two alternating-current voltage lines and the first input line, the first capacitor connected in parallel with the first bidirectional switch, a second capacitor connected in parallel with the second bidirectional switch, a third capacitor connected in parallel with the third bidirectional switch, and a fourth capacitor connected in parallel with the fourth bidirectional switch.

12. The rectifier circuit according to claim 10, wherein the surge suppression circuit includes a second inductor connected between another of the two alternating-current voltage lines and the second input line.

13. The rectifier circuit according to claim 1, wherein the bidirectional switch includes a metal-oxide semiconductor field-effect transistor (MOSFET) or a gallium nitride field-effect transistor (GaNFET).

14. The rectifier circuit according to claim 1, wherein the switch circuit drives a motor.

15. A wireless power transmission apparatus, comprising:
the rectifier circuit according to claim 1;
a power transmission coil configured to wirelessly transmit alternating-current power; and
a power reception coil configured to wirelessly receive the alternating-current power and to supply an alternating-current voltage to the rectifier circuit.

16. The rectifier circuit according to claim 1, wherein the surge suppression circuit gently changes the impedance of the switch circuit before and after a period of the dead time by using inductance-capacitance (LC) resonance.

* * * * *